(12) United States Patent
Fujimoto et al.

(10) Patent No.: US 11,725,685 B2
(45) Date of Patent: Aug. 15, 2023

(54) CAULKING BOLT

(71) Applicant: AOYAMA SEISAKUSHO CO., LTD., Niwa-Gun (JP)

(72) Inventors: Yukinori Fujimoto, Niwa-Gun (JP); Shigeki Matsunami, Niwa-Gun (JP); Keiichiro Masui, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 579 days.

(21) Appl. No.: 16/900,065

(22) Filed: Jun. 12, 2020

(65) Prior Publication Data

US 2020/0300287 A1    Sep. 24, 2020

Related U.S. Application Data

(63) Continuation of application No. PCT/JP2018/044861, filed on Dec. 6, 2018.

(30) Foreign Application Priority Data

Feb. 9, 2018  (JP) .................................. 2018-021732

(51) Int. Cl.
*F16B 35/06*  (2006.01)
*B21K 25/00*  (2006.01)
*F16B 35/04*  (2006.01)
*F16B 37/06*  (2006.01)
*F16B 39/282*  (2006.01)

(52) U.S. Cl.
CPC .............. *F16B 35/06* (2013.01); *B21K 25/00* (2013.01); *F16B 35/048* (2013.01); *F16B 37/068* (2013.01); *F16B 39/282* (2013.01)

(58) Field of Classification Search
CPC ...... F16B 35/048; F16B 35/06; F16B 37/068; F16B 39/282; B21K 25/00
USPC ......... 411/132, 143–145, 160, 161, 162–163
See application file for complete search history.

(56) References Cited

U.S. PATENT DOCUMENTS 3,389,734 A * 6/1968 Gutshall ................ F16B 39/282
411/959
3,605,845 A * 9/1971 Junker .................. F16B 39/282
411/959
4,223,711 A * 9/1980 Tabor .................... F16B 39/282
411/188
4,749,319 A * 6/1988 Sygnator ............... F16B 35/048
411/311

(Continued)

FOREIGN PATENT DOCUMENTS

CN    1193082 A    9/1998
CN    103362932 A   10/2013
(Continued)

OTHER PUBLICATIONS

European Office Action dated May 11, 2022 (Application No. 18 826 829.6).

(Continued)

*Primary Examiner* — Roberta S Delisle
(74) *Attorney, Agent, or Firm* — Burr Patent Law, PLLC (57) ABSTRACT

A caulking bolt includes a shank and a head, wherein a bearing face of the head has, along an outer circumference of the shank, a groove having a ring shape into which a (Continued)

crimped member is fitted. The caulking bolt includes projections and depressions for whirl-stop in the groove.

7 Claims, 6 Drawing Sheets

(56) References Cited

U.S. PATENT DOCUMENTS

| | | | | |
|---|---|---|---|---|
| 4,764,066 A * | 8/1988 | Terrell | ............ | F16B 39/28 |
| | | | | 411/399 |
| 4,966,512 A | 10/1990 | Takaku | | |
| 5,622,464 A * | 4/1997 | Dill | ............ | F16B 35/048 |
| | | | | 411/399 |
| 5,746,560 A * | 5/1998 | Barth | ............ | F16B 35/065 |
| | | | | 411/959 |
| 6,125,524 A * | 10/2000 | Mueller | ............ | F16B 37/068 |
| | | | | 29/520 |
| 2004/0042870 A1 | 3/2004 | Parker et al. | | |
| 2005/0147480 A1 | 7/2005 | Robertson | | |
| 2006/0002784 A1 * | 1/2006 | Curtis | ............ | F16B 33/004 |
| | | | | 411/371.1 |
| 2010/0074712 A1 * | 3/2010 | Shinjo | ............ | F16B 35/06 |
| | | | | 411/337 |
| 2013/0185917 A1 * | 7/2013 | Diehl | ............ | F16B 39/282 |
| | | | | 411/166 |
| 2014/0003882 A1 | 1/2014 | Babej | | |
| 2015/0377271 A1 * | 12/2015 | Rintelmann | ............ | F16B 37/14 |
| | | | | 411/533 |
| 2018/0266475 A1 | 9/2018 | Hoshino et al. | | |

FOREIGN PATENT DOCUMENTS

| | | |
|---|---|---|
| EP | 0 864 766 A1 | 9/1998 |
| JP | 2002-089528 A1 | 3/2002 |
| JP | 2002-364622 A | 12/2002 |
| JP | 2017-155860 A1 | 9/2017 |

OTHER PUBLICATIONS

Japanese Office Action (Application No. 2018-021732) dated Nov. 30, 2021 (with English translation).
Chinese Office Action (Application No. 201880087906.8) dated Aug. 17, 2021.
International Search Report and Written Opinion (Application No. PCT/JP2018/044861) dated Dec. 6, 2018.
Japanese Office Action (Application No. 2018-021732) dated Mar. 15, 2022.

* cited by examiner

CAULKING BOLT

TECHNICAL FIELD

The present invention relates to a caulking bolt.

BACKGROUND ART

As described in Patent Literature 1, a caulking bolt that is crimp-fixed to a plate-like crimped member is known. The caulking bolt described in Patent Literature 1 has a groove which is formed in the outer circumference of the shank so that removal force is secured. In addition, a protrusion for whirl-stop is provided on the bearing face so as to extend in the longitudinal direction of the shank.

CITATION LIST

Patent Literature

PTL 1: JP 2017-155860 A

Meanwhile, in the configuration described in Patent Literature 1, machining is required for both the shank and the bearing face. Also, with the configuration described in Patent Literature 1, the distance between the bearing face and the regular thread start is long. With such a caulking bolt, if the thickness of the crimped member is thin, there is a possibility that the caulking bolt cannot be fastened to the nut. In addition, when a member made of a soft material such as aluminum is used for the crimped member, even if an attempt is made to perform the whirl-stop by the protrusion provided around the shank of the bearing face, it is not possible to exhibit a sufficient function.

SUMMARY OF INVENTION

Technical Problem

The inventors of the present invention have solved this problem by intensively studying this point. An object of the present invention is to make it possible to use the bearing face for securing whirl-stop and removal force.

Solution to Problem

In order to solve the above problem, according to the present invention, there is provided a caulking bolt including a shank and a head, wherein a bearing face of the head has, along an outer circumference of the shank, a groove having a ring shape into which a crimped member is fitted, and wherein the caulking bolt includes a projection and a depression for whirl-stop in the groove.

In addition, it is preferable that the groove be configured such that a deep portion spreads more outward than a shallow portion.

It is preferable that the angle formed by the outer peripheral face of the groove and the outer peripheral reference face of the head be 10 degrees or more and 20 degrees or less, and the groove have a plurality of projections and depressions.

Further, it is preferable that the depth of the groove be 0.9 mm or more and 1.3 mm or less.

Further, it is preferable that the crimped member be plastically deformed and allowed to flow into a regular thread start of the shank.

It is also preferable that the shank have a regular thread start at a position where a shortest distance between the regular thread start and the bearing face is 1.2 mm or less.

Further, it is also preferable that a crimping structure in which an aluminum crimped member is crimped into the caulking bolt be provided.

It is also preferable that a crimping structure in which a regular thread start provided on the caulking bolt is positioned in a hole of a crimped member be provided.

Advantageous Effects of Invention

In the present invention, the bearing face can be used for securing whirl-stop and removal force.

DESCRIPTION OF EMBODIMENTS

Figure 1:
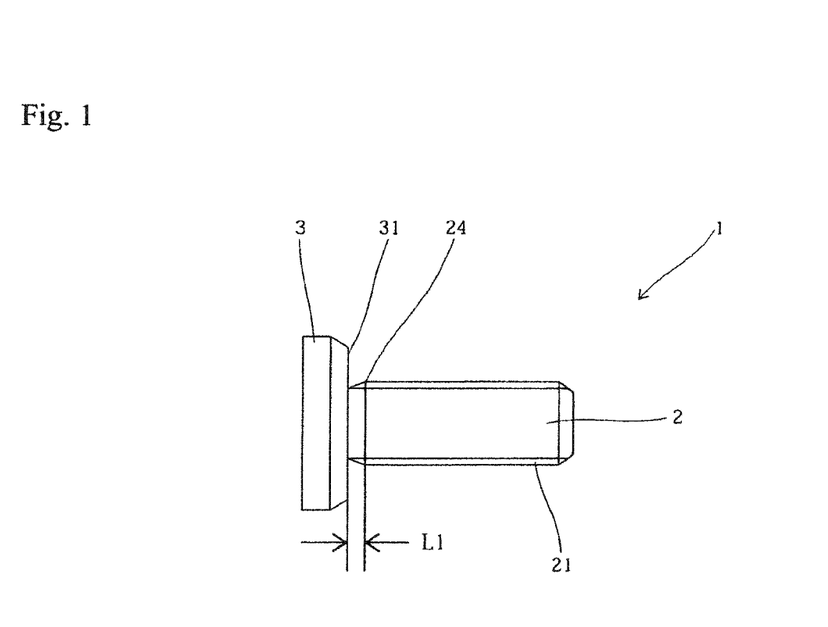
FIG. 1 is a side view of a caulking bolt according to an embodiment.

Hereinafter, modes for carrying out the invention will be described. In the following description, a caulking bolt 1 will be described by taking an iron M6 bolt as an example. As can be understood from FIGS. 1 to 3, the caulking bolt 1 of the embodiment includes a shank 2 and a head 3. A bearing face 31 of the head 3 has a groove 32 into which a crimped member 5 is fitted. The bearing face 31 of the head 3 has, along the outer circumference of the shank 2, the groove 32 having a ring shape into which the crimped member 5 is fitted. Therefore, the crimped member 5 can be plastically deformed so as to be fitted into the groove 32. This makes it easier to secure removal force. In addition, the groove 32 has projections and depressions for whirl-stop. Therefore, the bearing face 31 can be used for securing whirl-stop and removal force. In the embodiment, a crimping structure 10 is formed by crimping the crimped member 5 made of aluminum, which is relatively soft, into the caulking bolt 1. The caulking bolt 1 having such a configuration can secure crimping strength with the crimped member 5.

Figure 2:
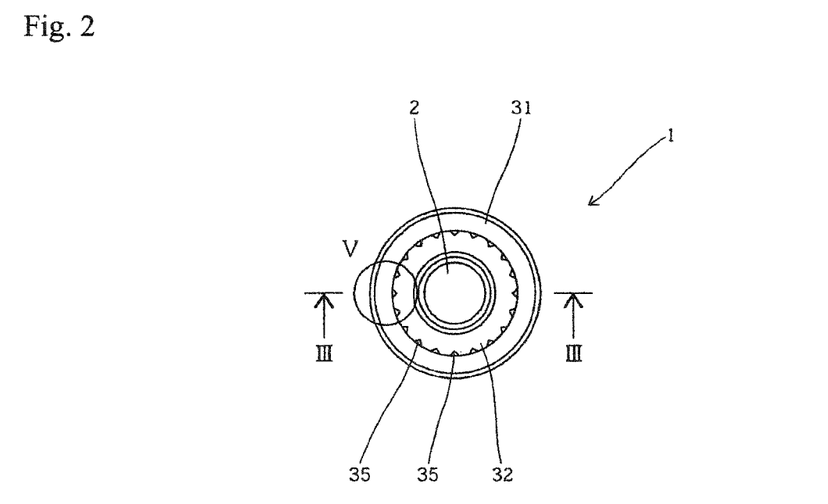
FIG. 2 is a view of a caulking bolt according to the embodiment as viewed from the tip of a shank.
Figure 3:
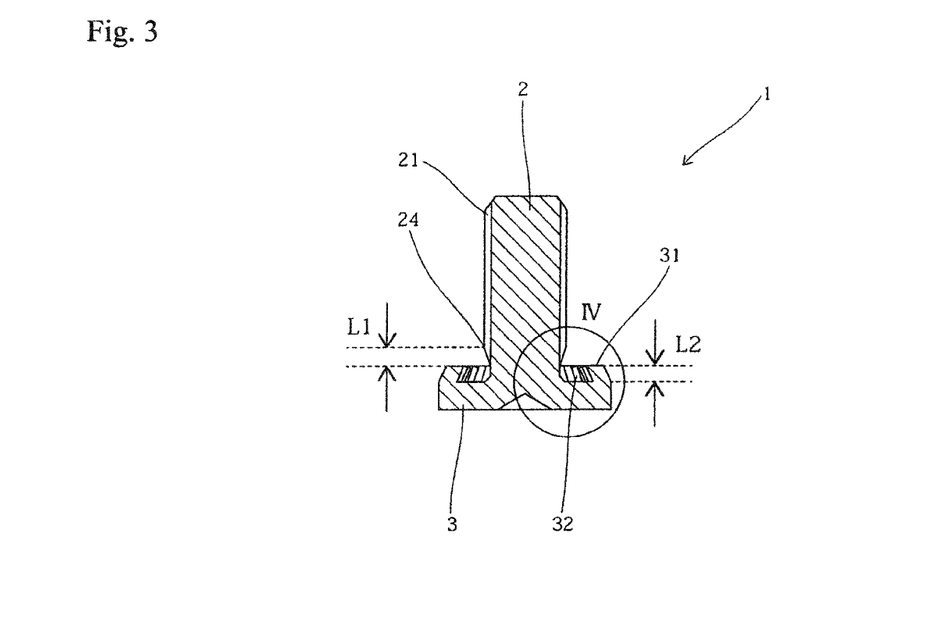
FIG. 3 is a cross-sectional view taken along the line in FIG. 2.

As can be understood from FIGS. 2 and 3, on the bearing face 31 of the caulking bolt 1 of the embodiment, the groove having a ring shape 32 is provided around the shank 2. The groove 32 is a portion into which part of the plastically deformed crimped member 5 flows when the crimped member 5 is crimped into the caulking bolt 1. The depth L2 of the groove 32 is preferably 0.9 mm or more and 1.3 mm or less. It is more preferable that it be 1.0 mm or more and 1.1 mm or less.

Figure 4:
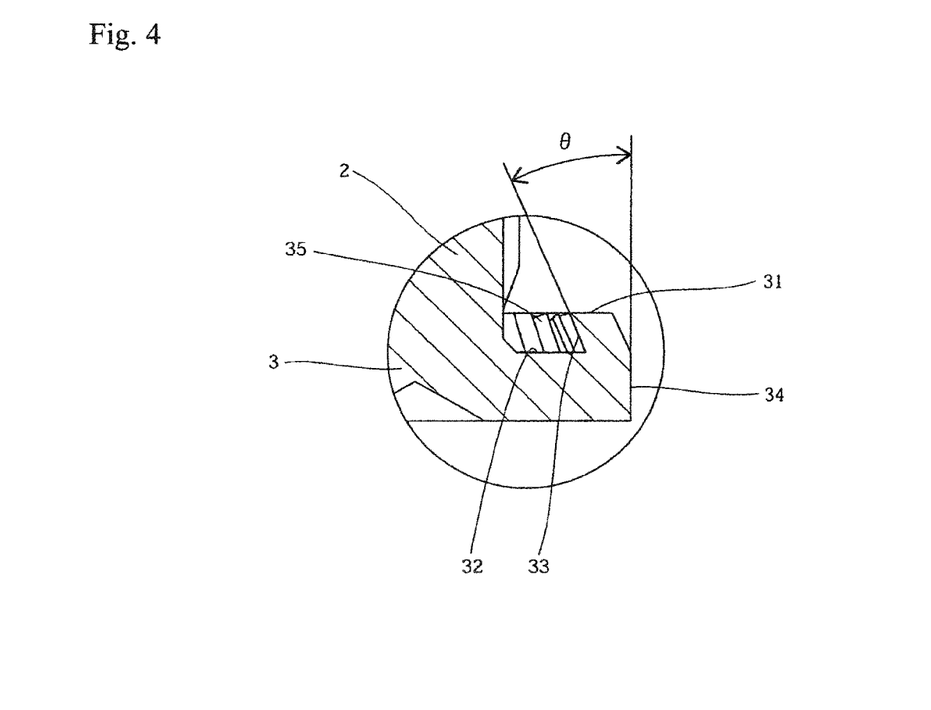
FIG. 4 is a partial enlarged view of the IV region of FIG. 3.

Further, as shown in FIG. 4, in this example, the groove 32 is configured such that a deep portion spreads more outward than a shallow portion. Since the groove 32 is formed so that the outer diameter at the deep portion is larger than that at the shallow portion, the crimped member 5 plastically deformed so as to fit in the groove 32 and the caulking bolt 1 are easily maintained in a coupled state. In this case, from the viewpoint of crimping strength and formability, it is preferable that the angle θ formed by an outer peripheral face 33 of the groove 32 and an outer peripheral reference face 34 of the head 3 be 10 degrees or more and 20 degrees or less. If this angle θ is less than 10 degrees, there is a possibility that removal force shortage may occur, and if it exceeds 20 degrees, the non-defective rate decreases due to manufacturing difficulty. The outer peripheral reference face 34 is a portion positioned on the outer circumference of the head 3 and extends in the longitudinal direction of the shank 2.

Figure 5:
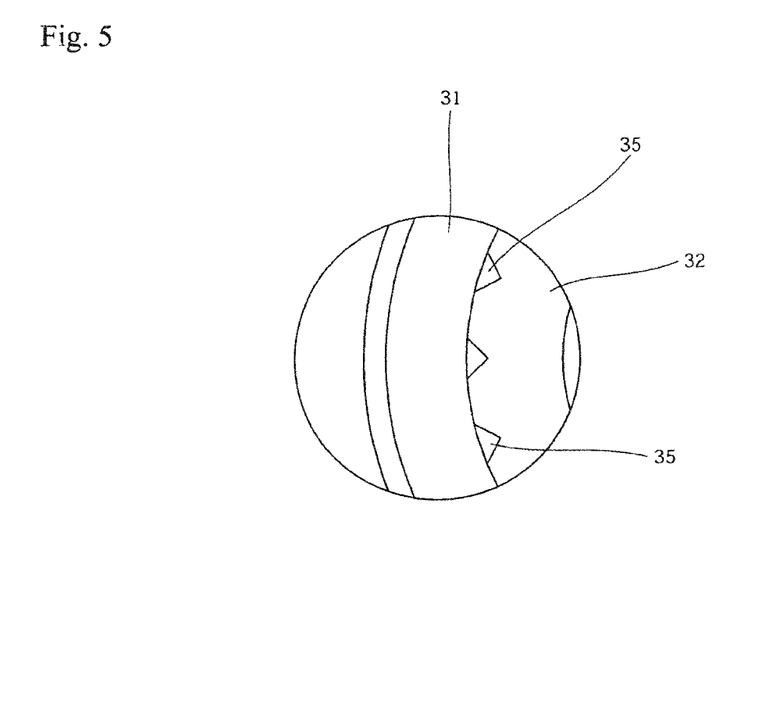
FIG. 5 is a partial enlarged view of the V region of FIG. 2.

In addition, it is preferable that a plurality of projections 35 be provided in the groove 32 as projections and depressions for whirl-stop. With such a configuration, it is possible to perform whirl-stop of the caulking bolt 1. The projections 35 of the embodiment are provided on the outer peripheral face 33 of the groove 32. Therefore, it is possible to apply a force of whirl-stop to the caulking bolt 1 from the outer circumference of the crimped member 5 which has flowed into the groove 32. As can be understood from FIG. 5, the projections 35 of the embodiment each are formed in a triangular shape in a plan view and are arranged at equal intervals on the outer peripheral face 33 of the groove 32.

Figure 6:
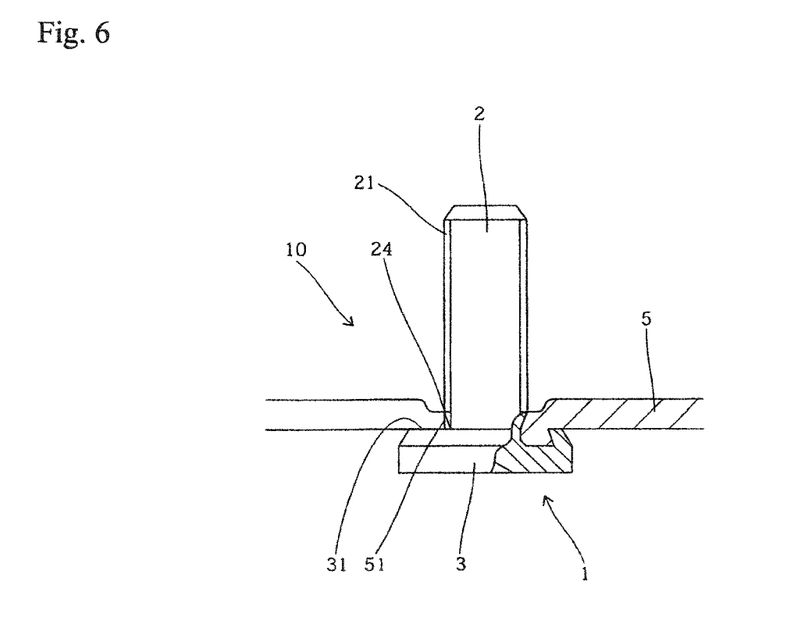
FIG. 6 is a side view showing a state in which a caulking bolt according to the embodiment and a crimped member are crimped. However, it partially shows a cross section.

Since the screw thread 21 is provided on the shank 2 from the position where the shortest distance L1 from the bearing face 31 is 1.2 mm or less toward the tip, the distance L1 between the screw thread 21 and the bearing face 31 is shortened. Therefore, as shown in FIG. 6, the crimping structure 10 is configured such that a regular thread start 24 with which the caulking bolt 1 is provided is positioned in a hole 51 of the crimped member 5. With such a structure, the screw thread 21 is positioned from the inside of the hole 51 of the crimped member 5 to the tip of the shank 2. Therefore, it is possible to appropriately screw the female screw member to the caulking bolt 1.

It should be noted that the caulking bolt 1 of the embodiment does not have a circular groove provided on the shank in order to secure the removal force. Instead of this groove, the groove 32 functions so as to ensure removal force. In the prior art, when the crimped member 5 is strongly crimped, the crimped member 5 may be bent as a whole. However, with such a configuration, such bending can be avoided. In addition, as described above, since the groove 32 provided on the bearing face 31 has the function of ensuring the removal force and the function of whirl-stop, restriction of the thickness of the crimped member 5 can be suppressed, and the crimping strength between the groove 32 and the crimped member 5 can be secured.

Figure 7:
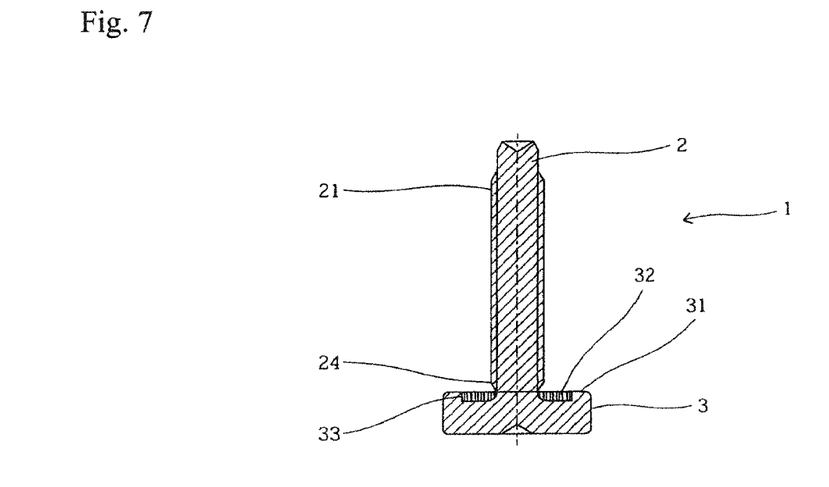
FIG. 7 is a side view of a caulking bolt according to another embodiment.
Figure 8:
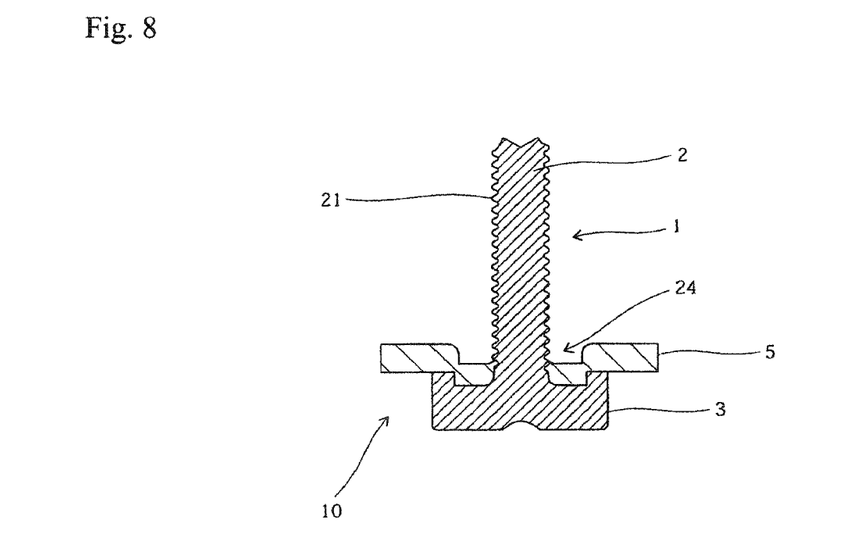
FIG. 8 is a cross-sectional view showing a state where the caulking bolt shown in FIG. 7 and a crimped member are crimped as viewed from the side.

As in the examples shown in FIGS. 1 to 6, there is no need for the deep portion to be configured to spread more outward than the shallow portion. As shown in FIG. 7, the outer peripheral face 33 of the groove 32 may extend so as to be substantially orthogonal to the bearing face 31. In the example shown in FIG. 7, the outer peripheral face 33 of the groove 32 has projections and depressions for whirl-stop. Further, the incomplete thread portion is provided relatively short, and the distance between the screw thread 21 and the bearing face 31 is set to be relatively short. For this reason, as shown in FIG. 8, it is possible to ensure removal force by plastically deforming the crimped member 5 so as to be in contact with the root of the shank 2. In the example shown in FIG. 8, the crimping structure 10 is configured in which the regular thread start 24 provided on the caulking bolt 1 is positioned in the hole of the crimped member 5. Further, the crimped member 5 can be plastically deformed and allowed to flow into the regular thread start 24 of the shank 2.

Figure 9:
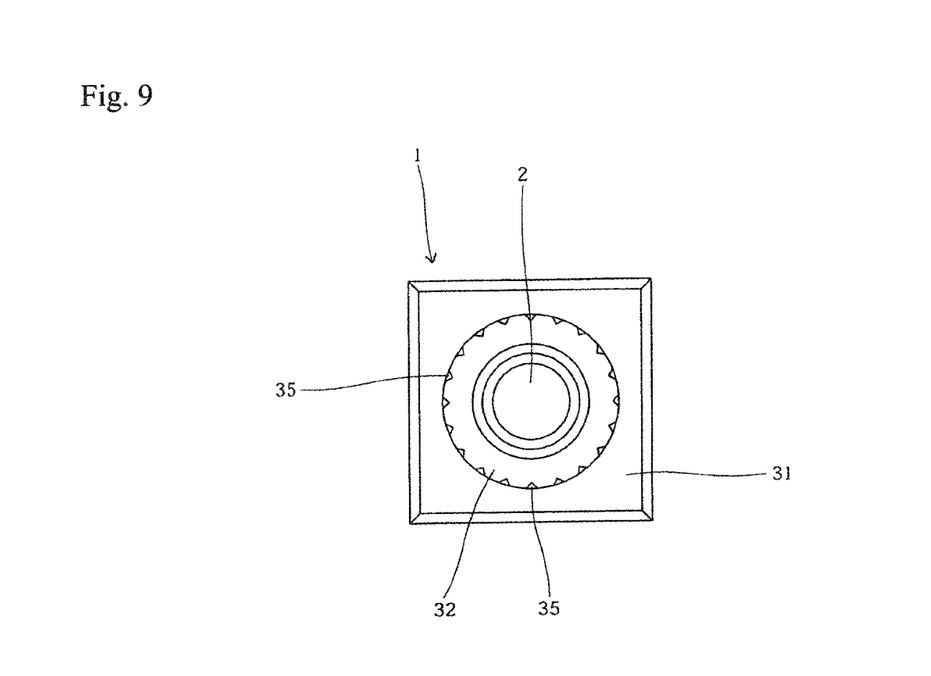
FIG. 9 is a view of a caulking bolt of a modification in which the outer shape of the head is changed as viewed from the tip of the shank.

In the above-described embodiment, the outer shape of the head 3 is circular when viewed from the tip of the shank 2, but as an example shown in FIG. 9, the outer shape of the head 3 may be quadrangular. Also in the example shown in FIG. 9, the groove 32 provided on the bearing face 31 of the head 3 is configured such that the deep portion spreads more outward than the shallow portion. A plurality of projections 35 are provided on the outer peripheral face of the groove 32. However, as shown in FIG. 7, the outer peripheral face 33 of the groove 32 may extend so as to be substantially orthogonal to the bearing face 31.

Figure 10:
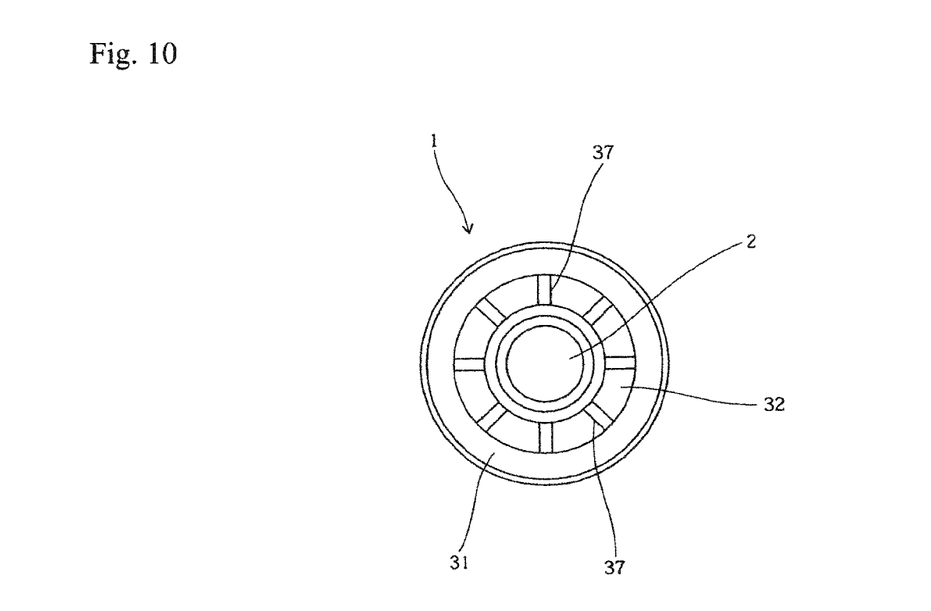
FIG. 10 is a view of a caulking bolt of a modification in which a protrusion having a whirl-stop function is provided in a groove as viewed from the tip of the shank.

Instead of the projections 35, the whirl-stop function may be performed by a protrusion 37 extending from the bottom face of the groove 32 toward the bearing face 31. In an example shown in FIG. 10, a plurality of protrusions 37 extending from the inner peripheral face to the outer peripheral face are radially arranged in the groove 32. Also in the example shown in FIG. 10, the groove 32 provided on the bearing face 31 of the head 3 is configured such that the deep portion spreads more outward than the shallow portion. However, as shown in FIG. 7, the outer peripheral face 33 of the groove 32 may extend so as to be substantially orthogonal to the bearing face 31.

Figure 11:
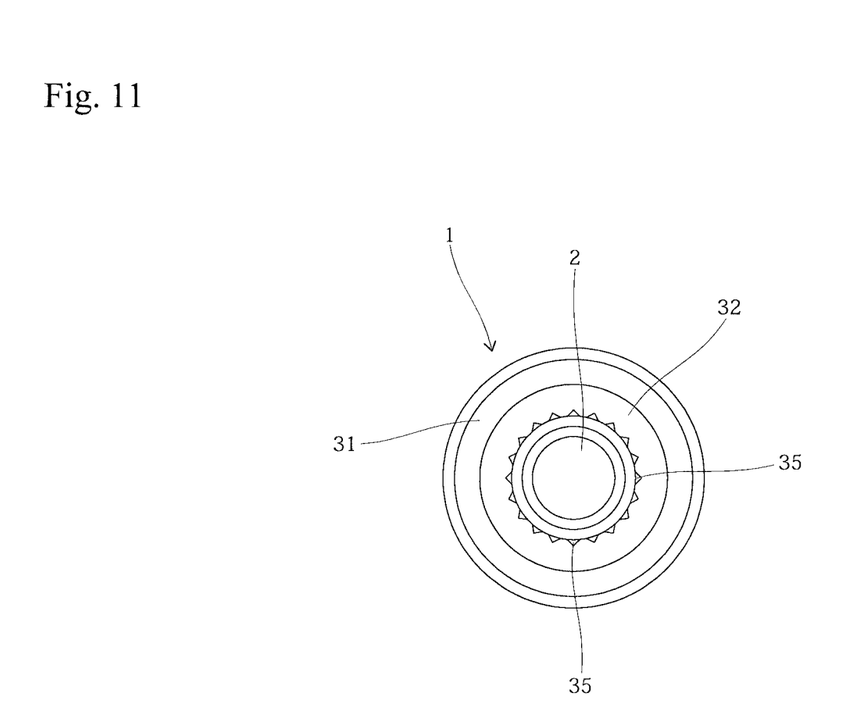
FIG. 11 is a view of a caulking bolt of a modification in which projections having a whirl-stop function are provided on an inner peripheral face of a groove as viewed from a tip end side of a shank.

Further, as shown in FIG. 11, the projections 35 may be provided on the inner peripheral face of the groove 32 so that the whirl-stop function can be performed. Even in the example shown in FIG. 11, the groove 32 provided on the bearing face 31 of the head 3 is configured such that the deep portion spreads more outward than the shallow portion. However, as shown in FIG. 7, the outer peripheral face 33 of the groove 32 may extend so as to be substantially orthogonal to the bearing face 31.

Although the embodiments have been described above, the present invention is not limited to the above-described embodiments, and various modes can be implemented. For example, the material of the caulking bolt need not be iron, and other materials may be used. In addition, the material of the crimped member need not be aluminum, and other materials may be used. Further, plating treatment may be applied.

REFERENCE SIGNS LIST

1 caulking bolt
2 shank
3 head
5 crimped member
10 crimping structure
21 screw thread 24 regular thread start
31 bearing face
32 groove
33 outer peripheral face of the groove
34 outer peripheral reference face of head
35 projection
51 hole

The invention claimed is:

1. A caulking bolt comprising a shank and a head, wherein a bearing face of the head has, along an outer circumference of the shank, a groove having a ring shape into which a crimped member is fitted, wherein the caulking bolt includes a projection and a depression for whirl-stop in which the projection is formed in a triangular shape, in a plan view, on an outer peripheral face of the groove, wherein the groove is configured such that a deep portion spreads more outward than a shallow portion, and wherein an inner space from a projected end of the projection and the depression is configured such that a deep portion spreads more outward than a shallow portion of the groove.

2. The caulking bolt according to claim 1, wherein an angle formed by the outer peripheral face of the groove and an outer peripheral reference face of the head is 10 degrees or more and 20 degrees or less, and wherein the groove has a plurality of the projections and the depressions.

3. The caulking bolt according to claim 1, wherein a depth of the groove is 0.9 mm or more and 1.3 mm or less.

4. The caulking bolt according to claim 1, wherein the crimped member is plastically deformed and allowed to flow into a regular thread start of the shank.

5. The caulking bolt according to claim 1, wherein the shank has a regular thread start at a position where a shortest distance between the regular thread start and the bearing face is 1.2 mm or less.

6. A crimping structure in which an aluminum crimped member is crimped into the caulking bolt according to claim 1.

7. A crimping structure in which a regular thread start provided on the caulking bolt according to claim 1 is positioned in a hole of a crimped member.

\* \* \* \* \*